(12) United States Patent
Clouthier et al.

(10) Patent No.: US 7,373,008 B2
(45) Date of Patent: May 13, 2008

(54) GRAYSCALE AND BINARY IMAGE DATA COMPRESSION

(75) Inventors: Scott Clouthier, Boise, ID (US); Anthony Ezell, Glenside, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 898 days.

(21) Appl. No.: 10/112,148

(22) Filed: Mar. 28, 2002

(65) Prior Publication Data

US 2003/0184809 A1    Oct. 2, 2003

(51) Int. Cl.
*G06K 9/36* (2006.01)
*G06K 9/46* (2006.01)

(52) U.S. Cl. .................................. 382/245; 382/233

(58) Field of Classification Search .............. 382/245
See application file for complete search history.

(56) References Cited

U.S. PATENT DOCUMENTS

| | | | | |
|---|---|---|---|---|
| 5,592,297 A | * | 1/1997 | Van Dorsselaer | 382/245 |
| 5,625,712 A | * | 4/1997 | Schoenzeit et al. | 382/232 |
| 5,930,399 A | * | 7/1999 | Kadyk et al. | 382/245 |
| 5,940,540 A | * | 8/1999 | Cornelissen | 382/245 |
| 6,021,227 A | * | 2/2000 | Sapiro et al. | 382/239 |
| 6,118,904 A | * | 9/2000 | Detch et al. | 382/245 |
| 6,192,159 B1 | * | 2/2001 | Wood et al. | 382/245 |
| 6,404,927 B1 | * | 6/2002 | Li et al. | 382/232 |
| 6,522,784 B1 | * | 2/2003 | Zlotnick | 382/245 |
| 6,961,474 B1 | * | 11/2005 | Hirano et al. | 382/246 |
| 6,987,891 B2 | * | 1/2006 | Miura | 382/245 |

FOREIGN PATENT DOCUMENTS

| | | |
|---|---|---|
| EP | 0149124 A | 7/1985 |
| EP | 0378762 A | 7/1990 |
| EP | 0703549 | 3/1996 |
| EP | 0703549 A | 3/1996 |
| EP | 0725485 A | 8/1996 |

OTHER PUBLICATIONS

European Search Report, dated Feb. 7, 2000, for related European patent application 99117891.4-2202, filed Feb. 14, 2000.
Saito, Takahiro et al., "Multi-Dimensional Lossy Coding via Copying with Its Practical Application to Interframe Low-Rate Video Compression," IEICE Transactions, Sep. 1991.
European Search Report dated Sep. 29, 2005.

* cited by examiner

*Primary Examiner*—Wenpeng Chen
*Assistant Examiner*—Yuzhen Ge

(57) ABSTRACT

Arrangements and procedures for compressing grayscale, binary and bi-level image data are disclosed. With respect to compressing binary and bi-level image data, individual byte image data values are retained that are different from a same row byte that is n-bytes back. For each retained byte image data value, individual byte image data values are encoded for bytes in a current byte row with replacement data strings. The replacement data strings include a replacement positioning code and a replacement count code for replicating retained byte image data values for subsequent data decompression as a group of substantially identical byte values.

20 Claims, 9 Drawing Sheets

GRAYSCALE AND BINARY IMAGE DATA COMPRESSION

RELATED APPLICATIONS

This patent application is related to U.S. patent application Ser. No. 09/193,321, titled "Compound Document Page Data Compression", which was filed on Nov. 16, 1998, which is assigned to the assignee hereof, and which is hereby incorporated by reference.

TECHNICAL FIELD

The following description relates to image data compression.

BACKGROUND

Traditional grayscale and binary compression techniques analyze image data stream a single-bit at a time to generate compressed image data. Conventional grayscale image encoding techniques use run-length encoding techniques that can not typically be used effectively to compress binary image data because the concept of similar pixel color groupings at a byte-level in binary image data is not present. And, traditional binary image data compression techniques to replace juxtaposed pixels that match predetermined bit patterns in a dictionary are computationally intensive—often resulting in slow response times in software implementations, and complex and expensive to implement in hardware.

For instance, conventional color and grayscale data compression techniques typically analyze an image data stream a single-bit at a time to determine if a sequential number of pixels, wherein each pixel is typically defined by 8-24 bits of data, have respective color values that correspond to a current pixel. When multiple sequential pixels with the same color are identified, a code is inserted into a compressed data stream to describe a color value and a repeat length. In this manner, multiple bytes (e.g., hundreds or even thousands of bytes) of color data can be represented with a couple of bytes of encoded data in a compressed data stream. This type of image data compression is called run-length encoding. Run-length encoding is often used to compress color and grayscale data because colors tend to occur juxtaposed or side-by-side to one another in color and grayscale images.

Run-length encoding of side-by-side pixels representing a same color, as often performed in the compression of color and grayscale image data, does not work very well when considering the compression of binary image data. This is because a binary pixel is represented with a single bit of data, not 8-24 bits of data that are byte-aligned. This means that a byte or 8-bits represent 8 separate pixels of color. Because only a single bit is used to represent a pixel, binary images typically do not exhibit enough color similarity from bit-to-bit to efficiently leverage the run-length encoding techniques.

For example, consider that color data that is represented with 8-24 bits of data per pixel are often reduced to binary or bi-level image data (2-bits per pixel) by halftoning procedures to change the data's attributes to conform to specific printer, marker, or imaging device output requirements. Halftones are created through a process called dithering, in which a density and pattern of black and white dots are varied to simulate different shades of gray. Such patterns of black and white dot values do not typically exhibit enough color similarity from bit-to-bit to efficiently leverage the run-length encoding techniques used to compress color and grayscale images, which represent pixels with 8-24 bits. Because of this limitation of run-length encoding techniques when it comes to the compression of binary data, a number of other conventional compression techniques are used to compress binary image data (certain ones of these techniques may also be used to compress grayscale data).

For example, conventional binary compression techniques (e.g., those based on an international standard called JBIG or Lempel-Ziv (LZ) algorithms) typically analyze image data a single-bit at a time. JBIG attempts to guess the bit, and then code the error of the bit with the guess using an arithmetic coding. Whereas LZ operates on single-bits attempting to identify pre-determined bit-patterns (i.e., patterns stored in a pattern dictionary). Once such a pattern is identified, it is replaced in the original image data with a corresponding tag that has a smaller bit footprint than the identified bit pattern. The binary bit-pattern dictionary can be expanded. For instance if a certain number of pixels have been read without a corresponding dictionary pattern match, those unmatched pixels can be stored in the dictionary as another pattern. Using such techniques binary data can be compressed. However, these binary compression techniques are problematic for a number of reasons.

For example, even though a binary image bit-pattern dictionary can be expanded to include otherwise unrepresented bit patterns, it can be appreciated that the range of binary image data that can be effectively compressed using these techniques decreases rapidly as image complexity (i.e., image entropy) increases. Additionally, hardware implementations of such binary compression techniques are typically very costly to implement and require highly skilled technicians to implement complex timing algorithms. Moreover, software implementations of conventional binary compression techniques typically result in exceedingly slow binary compression response times due to the computationally intensive nature of analyzing image data for complex bit-patterns a single-bit at a time.

The following arrangements and procedures address these and other problems associated with compressing grayscale and binary data.

SUMMARY

Arrangements and procedures for compressing grayscale, binary and bi-level image data are disclosed. With respect to compressing binary and bi-level image data, individual byte image data values are retained that are different from a same row byte that is n-bytes back. For each retained byte image data value, individual byte image data values are encoded for bytes in a current byte row with replacement data strings. The replacement data strings include a replacement positioning code and a replacement count code for replicating retained byte image data values for subsequent data decompression as a group of substantially identical byte values.

BRIEF DESCRIPTION OF THE DRAWINGS

The same numbers are used throughout the drawings to reference like features and components.

FIG. 6 is a flowchart diagram showing further aspects of literal byte value encoding of FIG. 5.

FIG. 7 is a flowchart diagram showing further aspects of literal byte value encoding of FIG. 6.

FIG. 8 is a flowchart diagram showing further aspects of run-length byte value encoding of FIG. 5.

FIG. 9 is a flowchart diagram showing further aspects of run-length byte value encoding of FIG. 8.

DETAILED DESCRIPTION

The following description sets forth exemplary arrangements and procedures for compressing grayscale and binary data. The subject matter is described with specificity to meet statutory requirements. However, the description itself is not intended to limit the scope of this patent. Rather, the inventor has contemplated that the claimed subject matter might also be embodied in other ways, to include different elements or combinations of elements similar to the ones described in this document, in conjunction with other present or future technologies.

Overview

The following arrangements and procedures compress grayscale (8 or more bits per pixel), binary (1 bit per pixel), and bi-level (2-bits per pixel) image data 8 bits (a byte) at a time. This is the case regardless of whether an image's pixels are represented with 1, 2, or 8, or more bits. Comparing byte aligned grayscale data to juxtaposed bytes of grayscale data in a data stream to identify bytes with colors that are the same or similar to a current color results in a fast compression pipeline because at least 8-bits are being compared to another 8-bits at any one time. Additionally, comparing a byte of pre-packed binary and bi-level pixels to juxtaposed pre-packed bytes of binary and bi-level pixels in a data stream to identify other bytes with colors that are the same or similar to a current byte color results in a fast compression pipeline because at least 8-bits are being compared to another 8-bits at any one time. (Recall that binary and bi-level pixels are only represented respectively by 1 and 2 bits).

An Exemplary Image Data Arrangement

Figure 1:
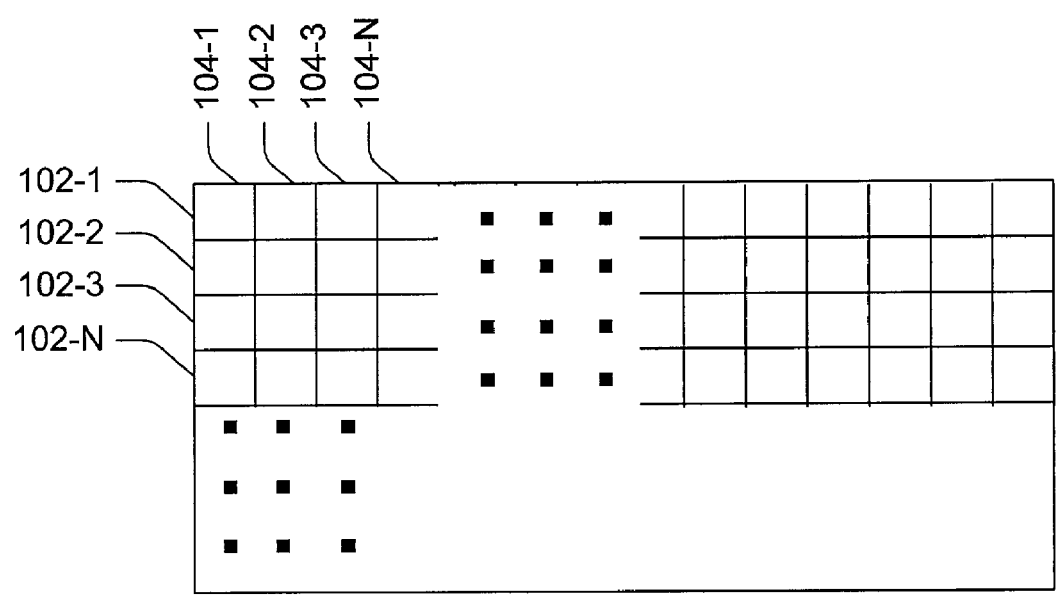
FIG. 1 shows an exemplary set of grayscale, binary, or bi-level image data prior to compression.

FIG. 1 shows an exemplary set of grayscale, binary, or bi-level image data 100 prior to compression. Image data 100 includes any number of byte rows 102 and any number of byte columns 104 of elements, wherein each element is identified by its corresponding row 102 column 104 pair of identifiers. For instance, respective image elements (102, 104) are indicated by element (1021, 104-1), element (102-1, 104-2), element (102-2, 104-1), and so on. Image data 100 represents grayscale image data, binary image data, or bi-level image data.

Regardless of whether or not image data 100 represents grayscale image data, binary image data, or bi-level image data, each row 102 column 104 element represents at least eight (8) bits or one byte of image data. Hereinafter, a row 102 column 104 element is often referred to as an "element". As discussed in greater detail below in reference to FIG. 3, which shows an exemplary procedure to compress grayscale, binary, and bi-level image data, each element of image data 100 represents a unit value that is compared to another or different element's unit value. An element's unit value or byte value is determined by the binary value of the 8-bits that comprise the element.

Figure 2:
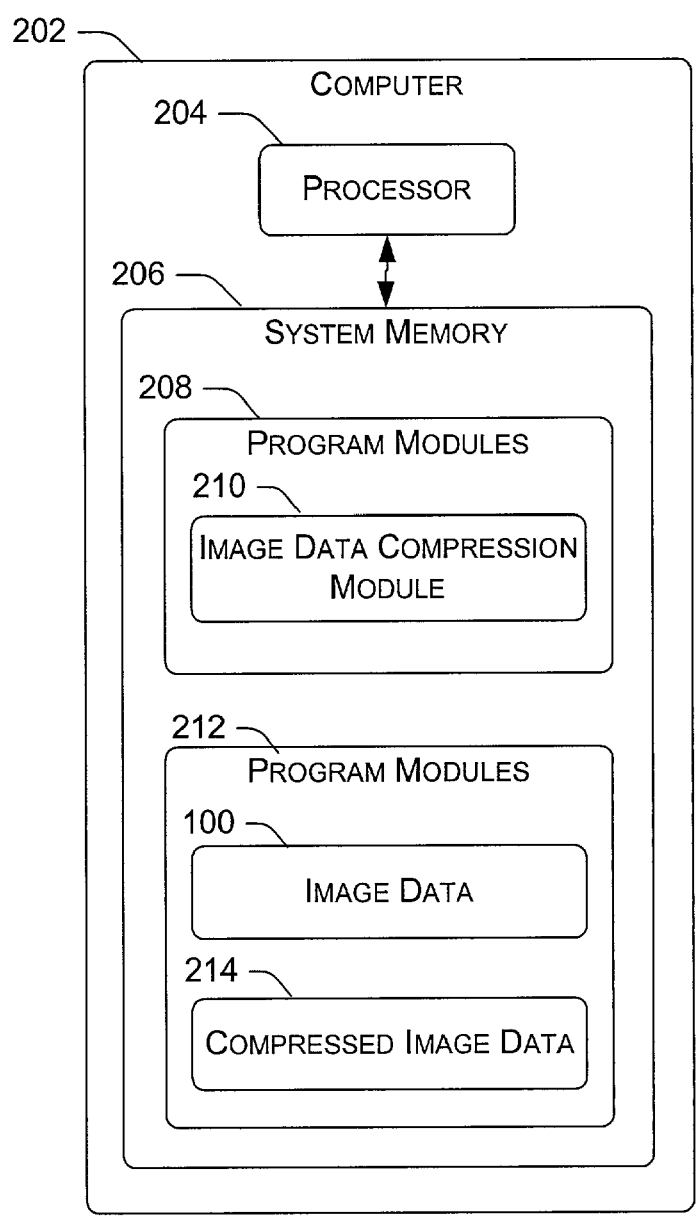
FIG. 2 illustrates an exemplary system to compress grayscale, binary, and bi-level image data.

"Byte rows" of the image data 100 of FIG. 2 include a "current byte row" and its preceding byte row 102 (e.g., row 102-2 and 102-1), which is a "seed byte row", or seed row having a relative north/south vertical orientation and an east/west horizontal orientation with respect to the current byte row. At the beginning of a row 102, a "current byte" immediately follows a left margin of the image data 100. Thereafter, the "current byte" refers to the byte in the current row 102 that is being processed.

An Exemplary System

FIG. 2 illustrates an exemplary system to compress grayscale, binary, and bi-level image data. The system includes a computing device 202 is operational as any one of a number of various computing devices such as a general purpose computer or PC, a server, a thin client, a thick client, a hand-held PDA, a laptop device, a multiprocessor system, a set top box, programmable consumer electronics, a wireless phone, an application specific integrated circuit (ASIC), and so on.

The computing device 202 includes a processor 204 that is coupled to a system memory 206. The system memory 206 includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM, and so on.

The processor 204 is configured to fetch and execute computer program instructions from program modules 208; and configured to fetch data 212 while executing one or more of the program modules 208. Program modules include routines, programs, objects, components, data structures, and so on, for performing particular tasks or implementing abstract data types.

For instance, program modules 208 include the image data compression module 210 and other applications (not shown) such as an operating system, an optional device driver, and so on. The image data compression module 210 compresses grayscale, binary, and/or bi-level image data 100 eight (8) bits (a byte) at a time, resulting in compressed image data 214. This is the case regardless of whether an image's pixels are represented with 1, 2, or 8, or more bits.

To compress the extracted rows 102 of grayscale image data, the compression module 210 retains individual byte values (i.e., unit values of particular row 102 and column 104 elements) for each byte value of the image data 100 that are different from adjacent byte values. For instance, the module 210 retains individual byte values (i.e., unit values of particular row 102 and column 104 elements) for each byte value of the image data 100 that are different from both a preceding row 102 and same column 104 byte value, and a horizontally adjacent same row 102 and same column 104 byte value.

To illustrate this aspect of grayscale image data compression, consider that, elements of run-length encoding along with seed-row-relative value encoding handle an 8-bit grayscale image data format, where the "seed row" is a vertically adjacent (i.e. superjacent or "north") byte row 102 to the row 102 in which current byte data is being considered for compression. This compression technique records only byte values that are different from both a vertically adjacent byte value and a horizontally adjacent byte value, e.g., the byte or element above, "north", and the element to the left, "west."

To compress the extracted rows 102 of binary or bi-level image data, the compression module 210 of FIG. 2 retains individual byte values for each byte value of the image data 100 that are different from byte values that are "n" bytes back in the row-column data stream 100. For instance, the module 210 retains individual byte values (i.e., unit values of particular row 102 and column 104 elements) for each current byte value of the image data 100 that is different from a same row 102 and "n-column-back" 104 byte value. To illustrate this aspect of binary and bi-level image data compression, consider that n equals five (5), then the compression module 210 retains individual byte values (i.e., unit values of particular row 102 and column 104 elements) for each current byte value of the image data 100 that is different from a same row 102 and "5-column-back" 104 byte value.

For each retained grayscale, binary, or bi-level byte value, individual byte values are encoded for bytes in a current byte row with replacement data strings. The replacement data strings include a replacement positioning code and a replacement count code for replicating retained byte values, both of which are used for subsequent decompression as a group of substantially identical byte values. Such codes are shown below in the data elements of data structure 300 of FIG. 3.

An Exemplary Data Structure

Figure 3:
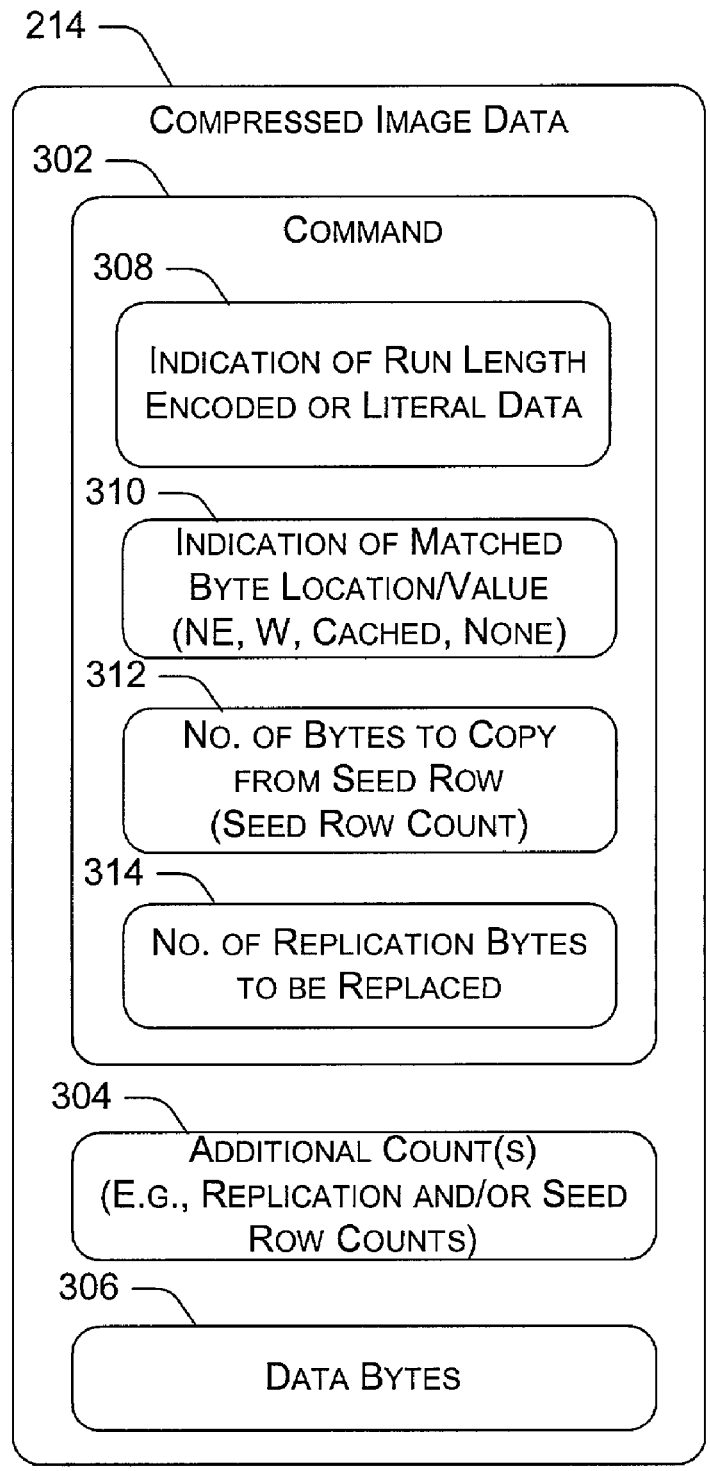
FIG. 3 shows an exemplary data structure to represent encoded grayscale, binary, or bi-level image data.

FIG. 3 shows an exemplary data structure 116 to represent encoded grayscale, binary, or bi-level image data. The data structure includes, for example, a command 302, a replication count indication 304, and data bytes 306. The command 302 includes the following information:

data field 308 to indicate whether or not corresponding data bytes is run-length encoded (i.e., a replacement-byte-run (RBR)) or literal data (i.e., a replacement-byte-list (RBL));

data field 310 to indicate byte value information such as:

(a) a new byte value for an entire run (note that a "byte value" is not necessarily a "color", since binary or bi-level data may be packed into a byte of data);

(b) a location of the byte value (e.g., ne, west, cached, or none—the byte value of a preceding column and same row byte value (a west byte), or the byte value in a super-adjacent row and following column byte value (a northeast byte value), and so on); or (c) use a cached byte value (note that byte value is not necessarily a "color" since binary or bi-level data may be packed into a byte of data). For RBR groups this indication 310 provides a byte or unit value for an entire compression run. For RPL data, this indication 310 provides the unit value for just the initial byte in the run—the remaining bytes are encoded in the data bytes data field 306. (The location is relative to the current byte location after the seed row copy run (i.e., a number of consecutive bytes to copy from a seed row)).

the seed row count data field 312 indicates a number of bytes (if any) to copy from a seed row of the current row; and the additional count(s) data field 314 indicates a number of consecutive seed row or replication bytes to be replaced.

The data bytes data field 306 is the actual encoded and/or literal image data bytes.

An Exemplary Procedure

FIGS. 4 through 9 show an exemplary compression pipeline 400 or procedure to compress grayscale, binary, and bi-level image data 100 of FIG. 1. Specifically, in reference to FIG. 4, at block 402, a row 102 is extracted from the image data 100 and placed into the compression pipeline. At block 404, the procedure 400 determines if an end of the extracted row (block 402) has been identified. If so, at block 414, the procedure determines if the last row 102 of the image data 100 has been processed or compressed. If so, the procedure ends. Otherwise, the procedure 400 continues as described above with respect to block 402, wherein a next row 102 of the image data 100 is extracted. In this manner, each row of the image data 100 is processed.

At block 406, the end of the extracted image data row 102 not having been encountered (block 404), the procedure 400 extracts a current byte and a next seed row byte of image data 100. The operational blocks of loop 416 quickly count seedrow copies with respect to the current source byte.

At block 410, the procedure 400 having determined that the current byte does not correspond (i.e., equivalent or similar) to the seed row byte (block 408), the procedure determines if the end of the extracted row (block 402) has been reached. If so, at block 414, it is determined if there are any more rows of image data 102 left to compress. If there are any more rows of image data 102 left to compress, the procedure 400 continues as discussed above with respect to block 402. If not, the procedure 400 ends. However, if the end of the extracted row (block 402) has not been reached (block 412), the procedure 400 continues at page reference "A" of FIG. 5, block 502.

Figure 4:
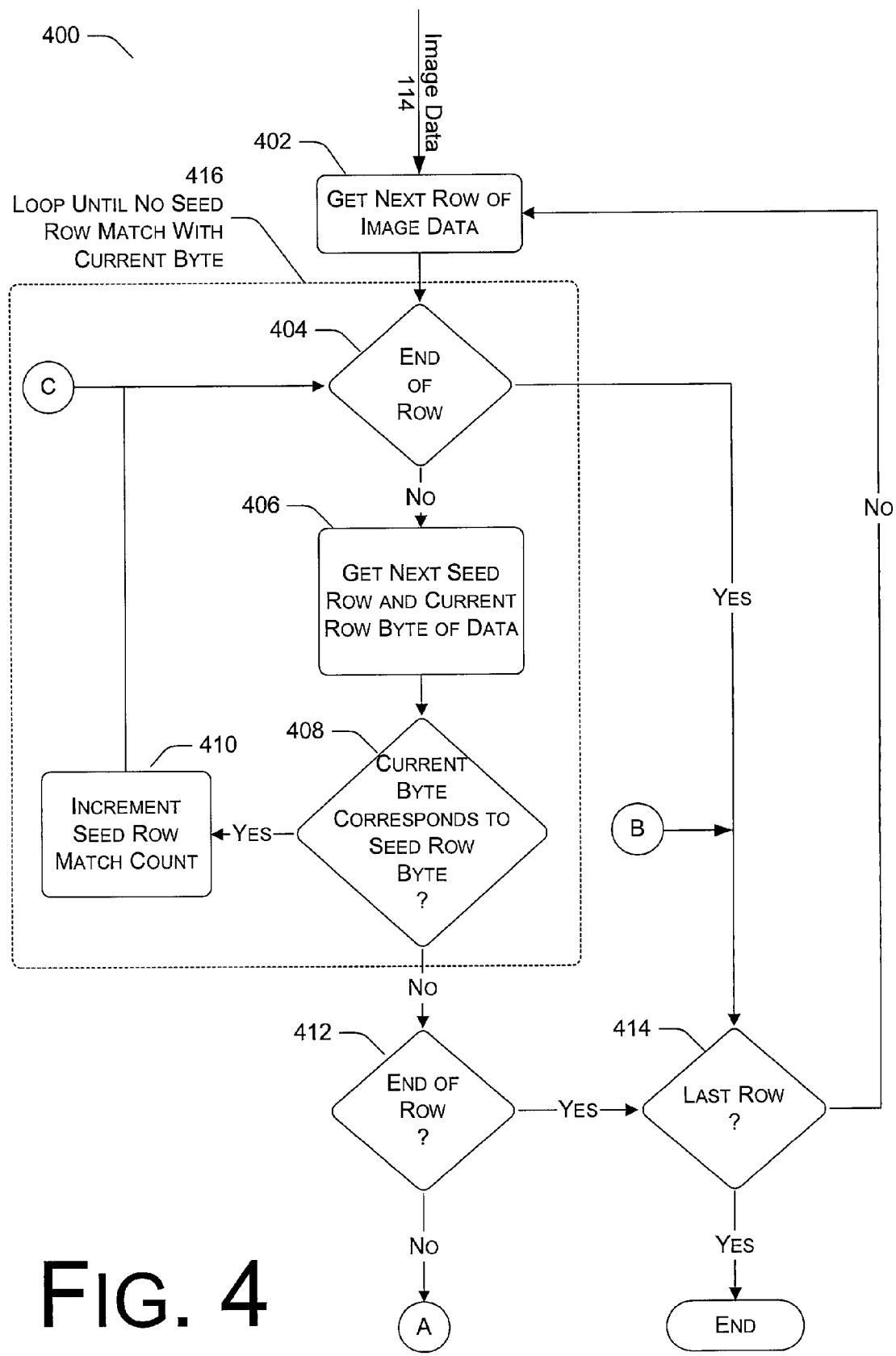
FIG. 4 shows an exemplary compression pipeline or procedure to compress grayscale, binary, and bi-level image data.
Figure 5:
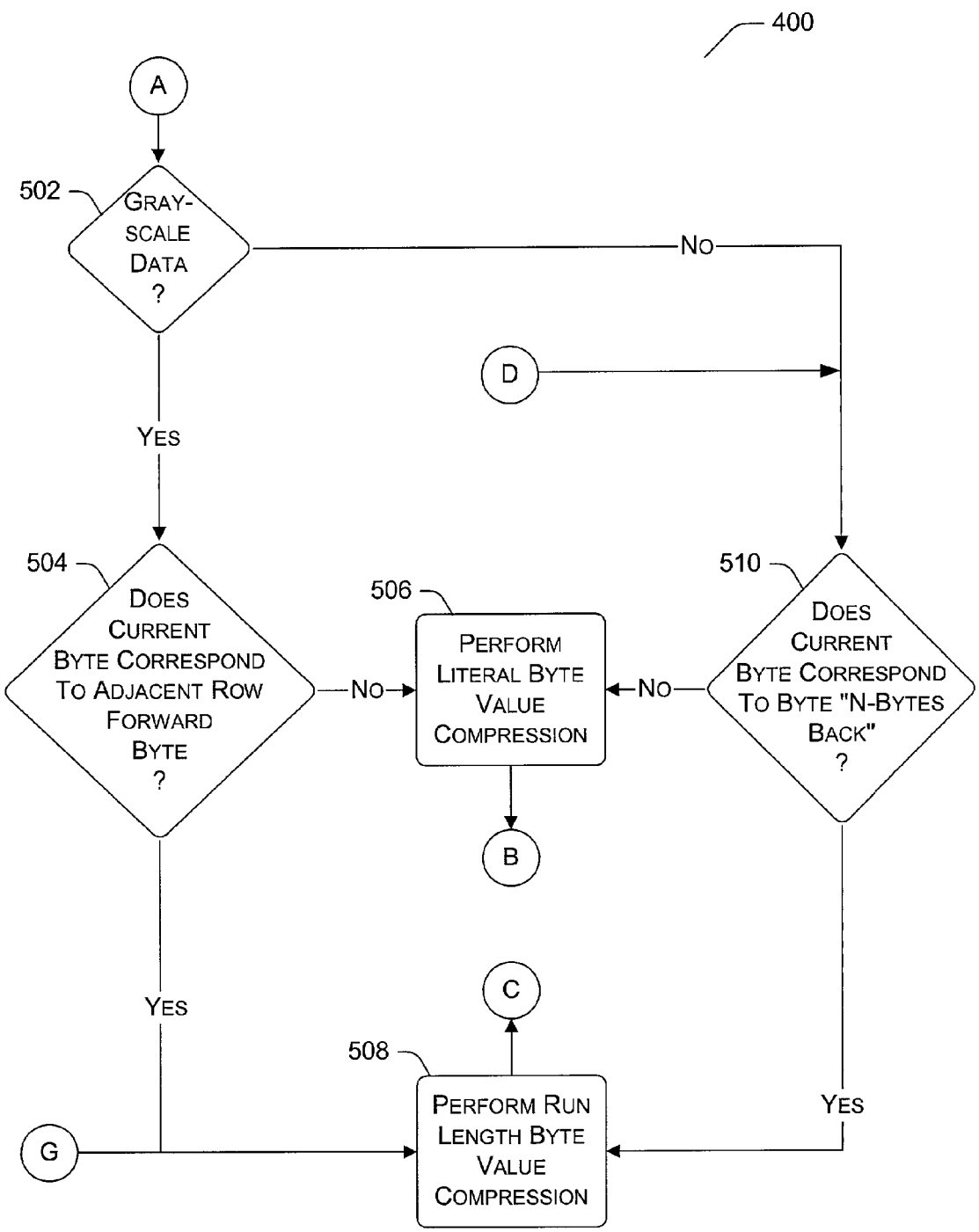
FIG. 5 shows further aspects of an exemplary procedure of FIG. 4 to compress grayscale, binary, and bi-level image data.

FIG. 5 shows further aspects of an exemplary compression pipeline 400 or procedure to compress grayscale, binary, and bi-level image data 100. Specifically, this portion of the procedure is operational when the end of the current row 102 has not been reached and the current row byte (block 406 of FIG. 4) does not match a seed row byte. At block 502, the procedure 400 determines if grayscale, binary, or bi-level data is being processed. This can be determined in a number of different ways, for example, by analyzing information in a header (not shown) positioned at the beginning of the image data 100. If the image data 100 is grayscale data, the procedure 400 continues at block 504, wherein it is determined if the current byte corresponds (i.e., is "equivalent" to or is "similar" to) the adjacent row forward byte (i.e., the northeast byte). A byte that is "equivalent" to a different byte has the same byte value. A byte that is "similar" to a different byte differs in byte value by some acceptable or predetermined amount.

If lossless compression is being performed, a particular byte that is being analyzed is required to be substantially equivalent to a different byte in the sequence of the image data to determine that a "run" with respect to at least the particular byte and the different byte has been identified. In contrast to such lossless compression techniques, lossy compression does not require such equivalence. Rather lossy compression allows the current row byte to be "similar" or differ in value by some predetermined threshold value from the other analyzed byte value and still constitute a "run" with respect to the other analyzed byte. Such a threshold value can be selected based on a number of criteria.

For instance, a particularly high threshold value may perform well in compressing images with substantial amounts of noise in the subject matter or graininess in film type. Whereas a relatively lower threshold value may be selected to compress images that require substantially intricate detail to be available when decompressed.

At block 506, the procedure 400 performs a literal byte value compression procedure, which is described in greater detail below in reference to FIGS. 6 and 7. At block 508, (the procedure 400 having determined that the current byte does correspond (i.e., is equivalent of similar in value, depending on whether lossless or lossy compression is being performed) to the adjacent row forward byte (block 504)), performs a run length byte value compression procedure. The run length byte value compression procedure is described in greater detail below in reference to FIGS. 8 and 9.

At block 510, the procedure 400, having determined that the image data 100 is not grayscale data, but rather binary or bi-level data, determines whether the current byte corresponds to a particular byte that is n-bytes back in the image data stream of the current row. Thus, the procedure, rather than looking forward in the image data stream, looks backwards in the data stream to identify corresponding bytes in a run. If the current byte does not correspond to the byte that is n-bytes back in the image data stream of the current row, at block 506, the procedure 400 performs literal byte value compression, which is described in greater detail below in reference to FIGS. 6 and 7. After the literal byte value compression procedure 506 is performed, the procedure 400 continues at page reference "B", as shown on FIG. 4, at block 414.

If the current byte corresponds to a particular byte that is n-bytes back in the current row (block 510), the procedure 400 continues at block 508, wherein a run length byte value compression procedure is performed (this procedure is described in greater detail below in reference to FIGS. 8 and 9). After the run length byte value compression operation 508 is performed, the procedure 400 continues at page reference "C", as shown on page FIG. 4, at block 404.

Literal Byte Value Encoding

Figure 6:
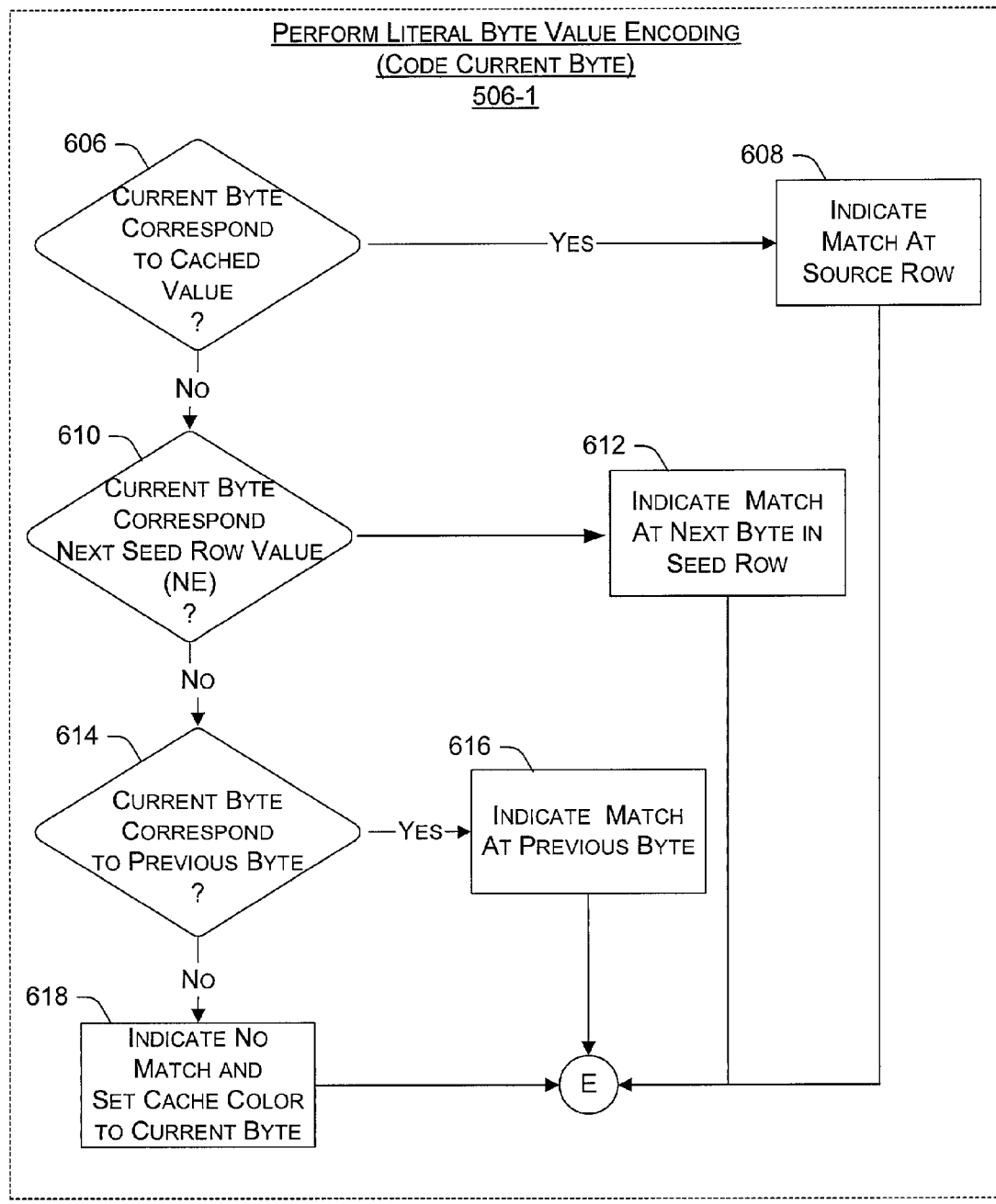
FIG. 6 shows further aspects of an exemplary procedure of FIG. 4 to compress grayscale, binary, and bi-level image data. Specifically.

FIG. 6 is a flowchart diagram showing further aspects of literal byte value encoding, block 506 of FIG. 5. At block 606, the current byte (block 406) is examined to determine if it corresponds (i.e., equivalent or similar) to a cached byte value. The cached byte value is initially set to a default value (typically white or 0x00). A cached byte is typically used when there are many bytes of the same value separated by seedrow copies, such as is found on a page of grayscale text. For instance, on a page of text, text characters usually have the same byte value (black, or 0xFF) and the space separating the characters are white space that is represented with corresponding byte values of 0x00. (Because there is white space separating each line of text, it is easy to see how seedrow copies would occur between each word on a line as well as between each character of each word on each line). If the last byte of a previous row has a byte value of 0x00, and the first byte of the next row has a byte value of 0x00, the command 302 of FIG. 3 for the current row would designate the first pixel as cached instead of having to insert the pixel into the compressed data stream 306.

Block 608 of the operation (the current byte corresponding to the cached byte value (block 606)) indicates that there has been a byte match in the source row 102 of bytes with the cached color value. In this case, the procedure 506-1 continues at 506-2, designated by page reference "E" of FIG. 7.

At block 610, the current byte not corresponding to the cached byte value (block 606), the block operation 506-1 (block 506 of procedure 400) determines whether the current byte corresponds to the next seed row byte value (i.e., the northeast positioned byte in the seed row with respect to the current byte). At block 612, the current byte corresponding to the north easterly positioned byte with respect to the current byte, indicates a byte match with a next byte in the seed row. The procedure 506-1 continues at 506-2, designated by page reference "E" of FIG. 7.

At block 614, the current byte not corresponding to a next seed row byte value (block 610), the procedure 506-1 determines whether the current byte corresponds to a previous adjacent (west) byte value. If so, at block 616, the procedure 506 indicates a byte match with respect to the previous adjacent byte in the source row 102. In this case, the procedure 506-1 continues at 506-2, designated by page reference "E" of FIG. 7.

At block 618, the current byte not corresponding to the previous adjacent byte in the source row (block 614), the procedure 506 indicates that there was no match between the current byte and the examined bytes, and sets the cached color (e.g., binary, bi-level, or grayscale) or byte value to the byte value of the current byte (block 406 of FIG. 4). The procedure 506-1 continues at 506-2, designated by page reference "E" of FIG. 7.

Figure 7:
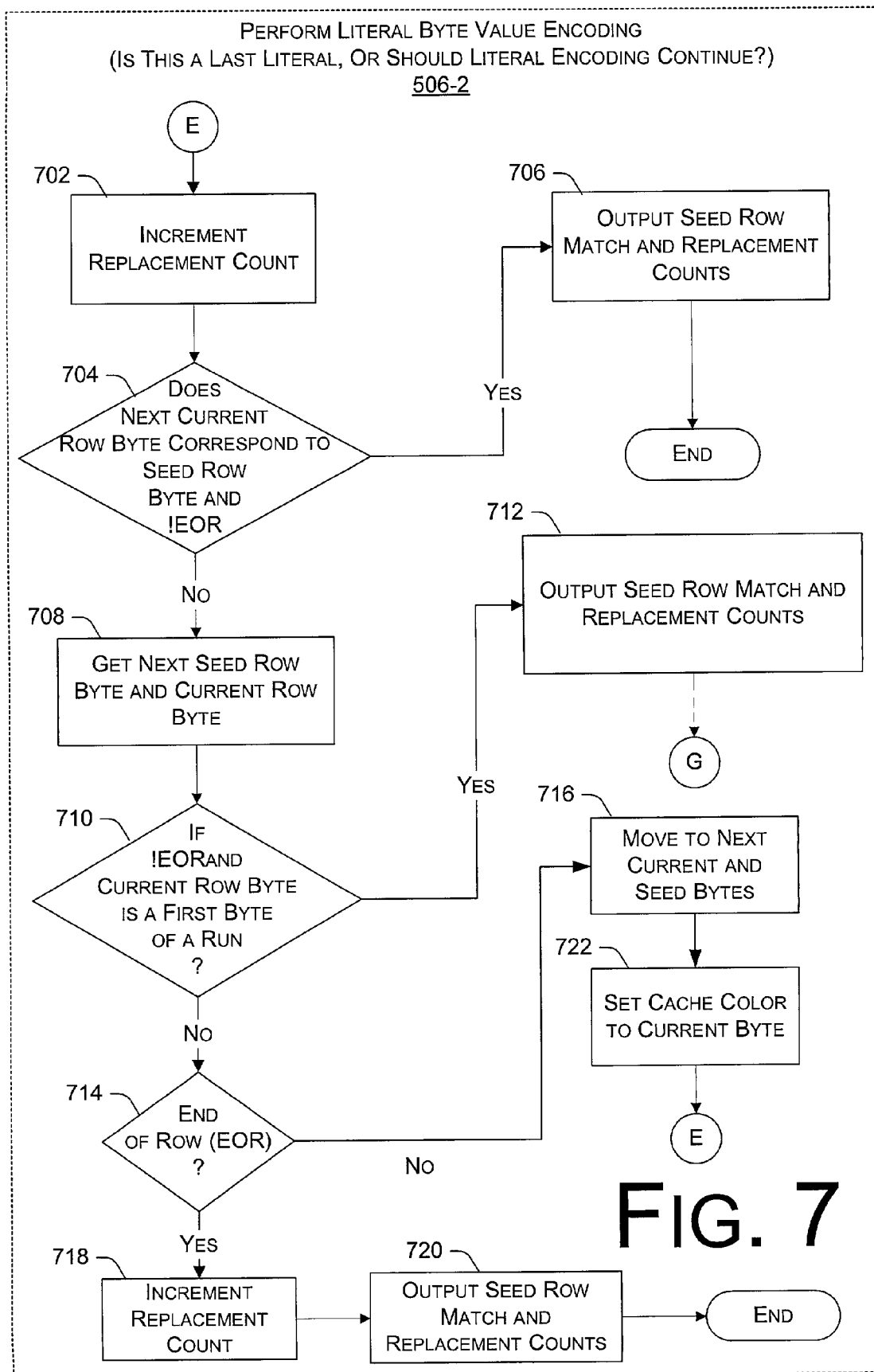
FIG. 7 shows further aspects of an exemplary procedure of FIG. 4 to compress grayscale, binary, and bi-level image data. Specifically.

FIG. 7 is a flowchart diagram showing further aspects of literal byte value encoding of block 506 of FIG. 5. Specifically, FIG. 7 is a continuation of the blocks of the procedure 506-1 shown in FIG. 6 that continue at on page reference "E", which corresponds to block 702. At block 702, the operation 506-2 increments the literal encoded byte replacement count (i.e., see counts 304 and 314 of FIG. 3). At block 704, if the end of the current row (EOR) in the image data has not been reached, the procedure determines if the next current row byte (E byte) corresponds to the next seed row byte (NE). If so at block 706, the procedure outputs the command 302 seed row match and replacement counts into the compressed data stream 214.

If the conditions of block 704 were not met, at block 708 the procedure gets the next seed row byte and the current row byte. At block 710, the procedure looks for a potential byte run (as long as the EOR has not been hit) by comparing the byte values of the current byte and the next byte (E). If a run has been identified, the seed row match counts are output into the compressed data stream 214. The pixel bytes are then output into the compressed data stream 214. These bytes are buffered during the literal comparison operation until such time that the literal comparison in 704 or 710 fail, or a maximum literal count is reached. In this case, the procedure continues at page reference "G" of FIG. 6.

At block 714, if the EOR has not been reached, the procedure continues at block 716 to reference the next current and seed row bytes of image data. At block 722, the procedure sets the cache color to equal the current byte. The procedure continues at page reference "E" of FIG. 7.

Otherwise, at block 714—the EOR having been reached, the procedure continues at block 718, where the replacement count is incremented. At block 720, the seed row match 312 and replacement counts 314 and/or are output into the compressed data stream 306.

An Exemplary Grayscale Binary, and Bi-Level Data Run-Length Encoding

Figure 8:
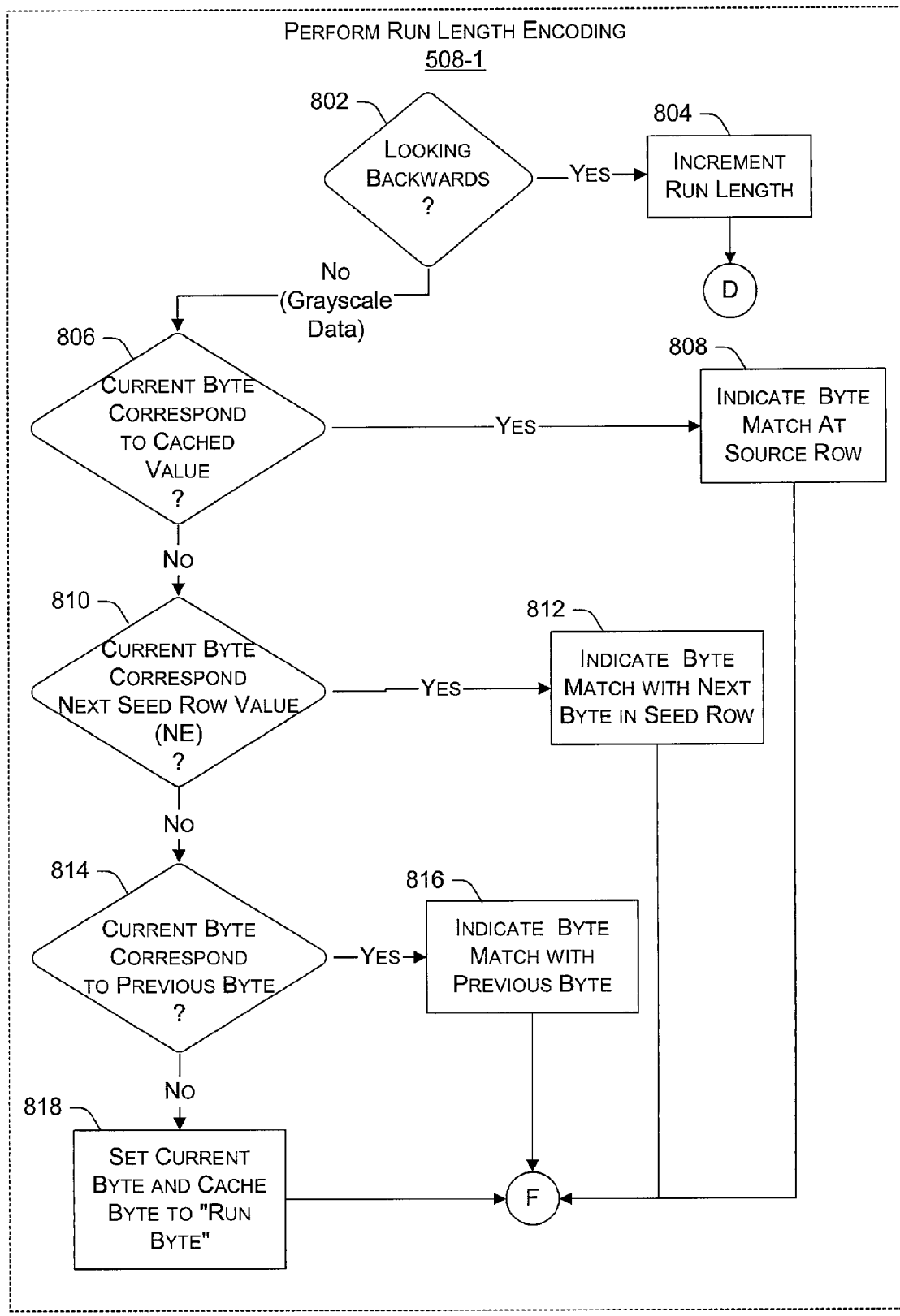
FIG. 8 shows further aspects of an exemplary procedure of FIG. 4 to compress grayscale, binary, and bi-level image data. Specifically.

FIG. 8 is a flowchart diagram showing further aspects of grayscale, binary, and bi-level image data run length encoding of block 508 of FIG. 5. Specifically, FIG. 8 shows aspects of run length encoding (vs. literal byte encoding) of binary, bi-level, and/or grayscale image data. At block 802, the procedure determines whether the procedure should "look-backwards" for potential data run bytes or forwards for data run bytes. If binary or bi-level image data 100 is being processed, the current byte in the source row of bytes is compared to a byte "n-bytes back" in the source row for comparison purposes. Otherwise, the procedure 508 is not looking backwards, but rather the procedure looks forwards to process grayscale image data. (E.g., when processing grayscale data, the procedure compares the source byte to adjacent bytes in the source row and the seed row for compression). Accordingly, if the procedure is looking backwards (block 804), at block 805, the procedure increments the run-length and continues at page reference "D" of FIG. 5, wherein the binary or bi-level data is compressed.

At block 806, the procedure 508 not looking backwards (block 802), the current byte is examined to determine if it corresponds (i.e., equivalent or similar) to a cached byte value. At block 808, the current byte corresponding to the cached byte value (block 806), the operation indicates that there has been a byte match in the source row 102 of bytes. In this case, the procedure continues at page reference "F" of FIG. 9.

At block 810, the current byte not corresponding to the cached byte value (block 806), it is determined whether the current byte corresponds to the next seed row byte value (i.e., the northeast positioned byte in the seed row with respect to the current byte). At block 812, the current byte corresponding to the north easterly positioned byte with respect to the current byte, indicates a byte match with a next byte in the seed row. The procedure continues at page reference "F" of FIG. 9.

At block 814, the current byte not corresponding to a next seed row byte value (block 810), it is determined whether the current byte corresponds to a previous adjacent (west) byte value. If so, at block 816, the procedure indicates a byte match with respect to the previous adjacent byte in the source row 102. In this case, the procedure continues at page reference "F" of FIG. 9. Otherwise, at block 818, the current byte not corresponding to the previous adjacent byte in the source row (block 814), the procedure indicates that there has not been any byte match (e.g., by setting the byte location indication 310 of FIG. 3 to "none" or zero (0)— denoting that the first byte value will be inserted into the compressed data stream immediately following the command byte and any subsequent seedrow copy counts. At block 818, the current byte value is set to equal the run byte value and the cache color value is set to equal the current byte.

Figure 9:
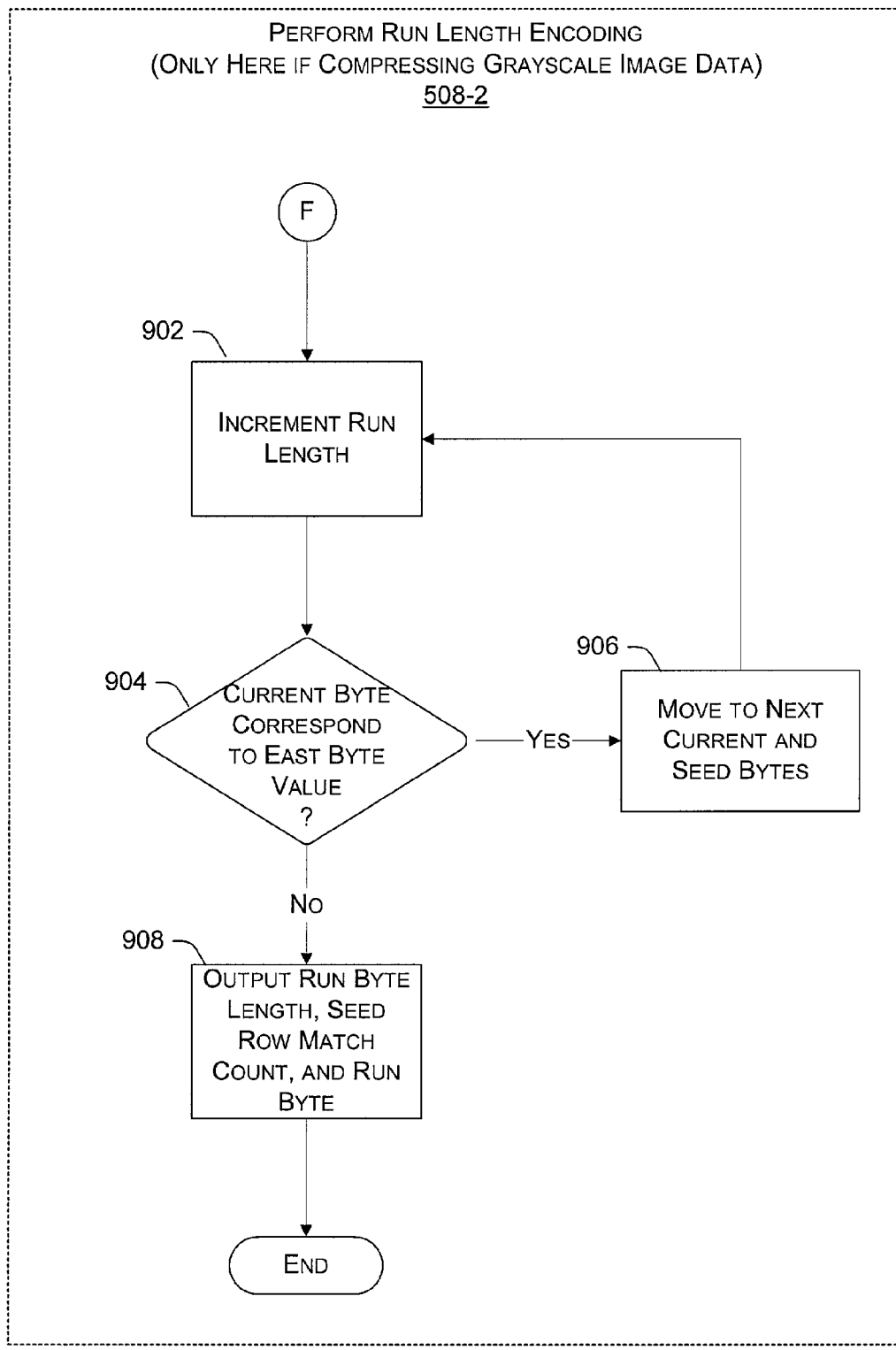
FIG. 9 shows further aspects of an exemplary procedure of FIG. 4 to compress grayscale, binary, and bi-level image data. Specifically.

FIG. 9 is a flowchart diagram showing further aspects of grayscale, binary, and bi-level image data run length encoding of block 508 of FIG. 5. Specifically, FIG. 9 is a continuation of the blocks of the procedure 508 shown in FIG. 8 that continue at on page reference "F", which corresponds to block 902 of FIG. 9. At block 902, the run length 314 is incremented. At block 904, the procedure 508 determines whether the current source row byte corresponds to an adjacent east source row byte value. If so, the procedure continues at block 906, wherein the next current and seed row bytes are obtained from the current row byte pair. From block 906, the procedure continues at block 902 as described above until the conditions of block 904 (also described above) are not met, whereupon the procedure continues at block 908 to output the run byte length, the current run byte, and the seed row match count.

CONCLUSION

Although the above description uses language that is specific to structural features and/or methodological acts, it is to be understood that the described arrangements and procedures defined in the appended claims are not limited to the specific features or acts described. Rather, the specific features and acts are disclosed as exemplary forms of implementing the described arrangements and procedures.

The invention claimed is:

1. A method of compressing data comprising:
   determining if grayscale, binary and bi-level image data is present;
   if grayscale image data is present:
      determining, by looking forward into the image data, if a current byte corresponds to an adjacent byte;
      if the current byte corresponds to the adjacent byte, then performing run length byte value compression; and
      if the current byte does not correspond to the adjacent byte, then performing literal byte value compression; and
   if binary or bi-level image data is present:
      determining, by looking backward into the image data, if a current byte corresponds to a byte n-bytes back in the binary or bi-level image data;
      if the current byte corresponds to the byte n-bytes back, then performing run length byte value compression; and
      if the current byte does not correspond to the byte n-bytes back, then performing literal byte value compression.

2. The method of claim 1, wherein run length compression is performed differently based on whether looking forward into image data or looking backward into image data was performed.

3. The method of claim 1, wherein literal byte value compression is performed by evaluating whether the current byte corresponds to (1) a cached value, (2) a next seed row value, or (3) a previous byte value, and if none of (1)-(3) are true, then selling the cache value to the current byte.

4. The method of claim 1, wherein the current byte corresponds to the adjacent byte if it has a same byte value or differs by some acceptable or predetermined amount.

5. The method of claim 1, wherein looking backward into the image data comprises retaining individual byte image data values that are different from a same row byte for n-bytes back.

6. The method of claim 5, additionally comprising:
   for each retained byte image data value, encoding individual byte image data values for bytes in a current byte row with replacement data strings wherein the replacement data strings include a replacement positioning code and a replacement count code for replicating retained byte image data values for subsequent data decompression as a group of substantially identical byte values.

7. The method of claim 1, wherein n is selected such that $1 \leq n \leq$ a total of the same row bytes minus one byte.

8. A computer-readable medium comprising computer-executable instructions for compressing image data, the computer-executable instructions comprising instructions for:
- determining if grayscale, binary and bi-level image data is present;
- if grayscale image data is present:
  - determining, by looking forward into the image data, if a current byte corresponds to an adjacent byte;
  - if the current byte corresponds to the adjacent byte, then performing run length byte value compression; and
  - if the current byte does not correspond to the adjacent byte, then performing literal byte value compression; and
- if binary or bi-level image data is present:
  - determining, by looking backward into the image data, if a current byte corresponds to a byte n-bytes back in the binary or bi-level image data;
  - if the current byte corresponds to the byte n-bytes back, then performing run length byte value compression; and
  - if the current byte does not correspond to the byte n-bytes back, then performing literal byte value compression.

9. The computer-readable medium of claim 8, wherein run length compression is performed differently based on whether looking forward into image data or looking backward into image data was performed.

10. The computer-readable medium of claim 8, wherein literal byte value compression is performed by evaluating whether the current byte corresponds to (1) a cached value, (2) a next seed row value, or (3) a previous byte value, and if none of (1)-(3) are true, then setting the cache value to the current byte.

11. The computer-readable medium of claim 8, wherein the current byte corresponds to the adjacent byte if it has a same byte value or differs by some acceptable or predetermined amount.

12. The computer-readable medium of claim 8, wherein looking backward into the image data comprises retaining individual byte image data values that are different from a same row byte for n-bytes back.

13. The computer-readable medium of claim 12, additionally comprising:
- for each retained byte image data value, encoding individual byte image data values for bytes in a current byte row with replacement data strings wherein the replacement data strings include a replacement positioning code and a replacement count code for replicating retained byte image data values for subsequent data decompression as a group of substantially identical byte values.

14. The computer-readable medium of claim 8, wherein n is selected such that $1 \leq n \leq$ a total of the same row bytes minus one byte.

15. A computing device comprising processing means for:
- determining if grayscale, binary and bi-level image data is present;
- if grayscale image data is present:
  - determining, by looking forward into the image data, if a current byte corresponds to an adjacent byte;
  - if the current byte corresponds to the adjacent byte, then performing run length byte value compression; and
  - if the current byte does not correspond to the adjacent byte, then performing literal byte value compression; and
- if binary or bi-level image data is present:
  - determining, by looking backward into the image data, if a current byte corresponds to a byte n-bytes back in the binary or bi-level image data;
  - if the current byte corresponds to the byte n-bytes back, then performing run length byte value compression; and
  - if the current byte does not correspond to the byte n-bytes back, then performing literal byte value compression.

16. The computing device of claim 15, wherein run length compression is performed differently based on whether looking forward into image data or looking backward into image data was performed.

17. The computing device of claim 15, wherein literal byte value compression is performed by evaluating whether the current byte corresponds to (1) a cached value, (2) a next seed row value, or (3) a previous byte value, and if none of (1)-(3) are true, then setting the cache value to the current byte.

18. The computing device of claim 15, wherein the current byte corresponds to the adjacent byte if it has a same byte value or differs by some acceptable or predetermined amount.

19. The computing device of claim 15, wherein looking backward into the image data comprises retaining individual byte image data values that are different from a same row byte for n-bytes back.

20. The computing device of claim 19, additionally comprising:
- for each retained byte image data value, encoding individual byte image data values for bytes in a current byte row with replacement data strings wherein the replacement data strings include a replacement positioning code and a replacement count code for replicating retained byte image data values for subsequent data decompression as a group of substantially identical byte values.

* * * * *

UNITED STATES PATENT AND TRADEMARK OFFICE
CERTIFICATE OF CORRECTION

PATENT NO.         : 7,373,008 B2                                        Page 1 of 1
APPLICATION NO. : 10/112148
DATED              : May 13, 2008
INVENTOR(S)        : Scott Clouthier et al.

It is certified that error appears in the above-identified patent and that said Letters Patent is hereby corrected as shown below:

On the Title page, in item (56), under "Foreign Patent Documents", in column 2, line 3, delete "EP     0703549     3/1996", 2nd occurrence.

In column 7, line 43, after "on" delete "page".

In column 10, line 49, in Claim 3, delete "selling" and insert - setting --, therefor.

Signed and Sealed this

Nineteenth Day of August, 2008

JON W. DUDAS
*Director of the United States Patent and Trademark Office*